United States Patent
Jeong et al.

(10) Patent No.: US 9,606,688 B2
(45) Date of Patent: Mar. 28, 2017

(54) TOUCH SENSING APPARATUS AND TOUCHSCREEN APPARATUS INCLUDING THE SAME

(71) Applicant: Samsung Electro-Mechanics Co., Ltd., Suwon-si (KR)

(72) Inventors: Moon Suk Jeong, Suwon-si (KR); Yong Il Kwon, Suwon-si (KR); Tah Joon Park, Suwon-si (KR); Byeong Hak Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 45 days.

(21) Appl. No.: 14/721,503

(22) Filed: May 26, 2015

(65) Prior Publication Data
US 2015/0346879 A1   Dec. 3, 2015

(30) Foreign Application Priority Data

May 28, 2014   (KR) .................. 10-2014-0064742
Dec. 2, 2014    (KR) .................. 10-2014-0170726

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2013/0271163 A1* | 10/2013 | Brunet | H03K 17/962 324/679 |
| 2014/0009216 A1* | 1/2014 | Jo | G06F 3/0418 327/517 |
| 2014/0009432 A1 | 1/2014 | Kwon et al. | |

FOREIGN PATENT DOCUMENTS

| KR | 10-2011-0137482 A | 12/2011 |
|---|---|---|
| KR | 10-2014-0007537 A | 1/2014 |
| KR | 10-2014-0007554 A | 1/2014 |
| KR | 10-2014-0029118 A | 3/2014 |

* cited by examiner

*Primary Examiner* — Viet Pham
*Assistant Examiner* — Christopher Kohlman
(74) *Attorney, Agent, or Firm* — NSIP Law

(57) ABSTRACT

A touch sensing apparatus may include a driving signal generating circuit including a first switch and a second switch and providing driving signals to a first node of a node capacitor, the driving signals being generated by switching operations of the first switch and the second switch, and a C-V converting circuit including a buffer circuit having a first feedback capacitor and a third switch disposed between a second node of the node capacitor and the first feedback capacitor and transferring a charging voltage of the node capacitor to the first feedback capacitor through a switching operation of the third switch to generate an output voltage. The buffer circuit further includes a fourth switch disposed between the second node of the node capacitor and a current source, and the fourth switch is turned on in an off operation section of the third switch.

18 Claims, 5 Drawing Sheets

TOUCH SENSING APPARATUS AND TOUCHSCREEN APPARATUS INCLUDING THE SAME

CROSS-REFERENCE TO RELATED APPLICATIONS

This application claims priority to, and the benefit of Korean Patent Application Nos. 10-2014-0064742 filed on May 28, 2014 and 10-2014-0170726 filed on Dec. 2, 2014, with the Korean Intellectual Property Office, the disclosures of which are incorporated herein by reference.

BACKGROUND

The application relates to a touch sensing apparatus and a touchscreen apparatus including the same.

A capacitive type touchscreen includes a plurality of electrodes having a predetermined pattern and defining a plurality of nodes in which changes in capacitance are generated by touches. The plurality of nodes, distributed on a two-dimensional plane, generate changes in self-capacitance or changes in mutual-capacitance when touches occur. Coordinates of touches may be calculated by applying a weighted average method, or the like, to the changes in capacitance generated in the plurality of nodes.

In order to accurately sense touches, it is preferable to obtain capacitance of a touch panel without saturation of a sensing signal, but since a capacitance value output by a high capacity touch panel may be relatively high, when a capacitor for sensing a capacitance value without loss is used in a touchscreen apparatus, an area and a volume of the apparatus may be problematically increased and costs for manufacturing the apparatus may be increased. In addition, a high capacity touch panel may have a wide deviation in an amount of capacitance in each respective node thereof, leading to a lack of precision in the detection of touches.

RELATED ART DOCUMENT

Korean Patent Laid-Open Publication No. 10-2014-0007554

SUMMARY

An exemplary embodiment in the present disclosure may provide a touch sensing apparatus and a touchscreen apparatus capable of preventing saturation of a sensing signal due to excessive capacitance and significantly reducing deviations in capacitance between a plurality of nodes.

According to an exemplary embodiment in the present disclosure, a touch sensing apparatus may include: a driving signal generating circuit including a first switch and a second switch and providing driving signals to a first node of a node capacitor, the driving signals being generated by switching operations of the first switch and the second switch; and a C-V converting circuit including a buffer circuit having a first feedback capacitor and a third switch disposed between a second node of the node capacitor and the first feedback capacitor and transferring a charging voltage to the first feedback capacitor from the node capacitor through a switching operation of the third switch to generate an output voltage, wherein the buffer circuit further includes a fourth switch disposed between the second node of the node capacitor and a current source and the fourth switch is turned on in an off operation section of the third switch.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
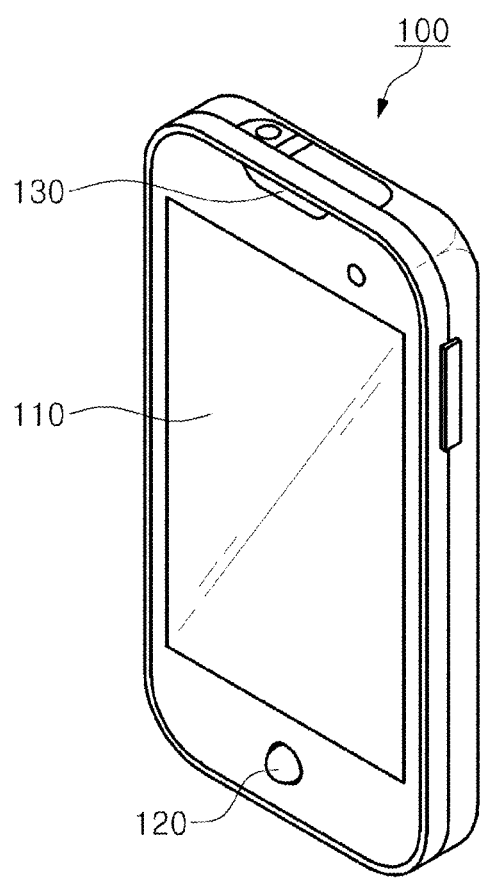
FIG. 1 is a perspective view illustrating an electronic device including a touchscreen apparatus according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

FIG. 1 is a perspective view illustrating an electronic device including a touchscreen apparatus according to an exemplary embodiment in the present disclosure.

Referring to FIG. 1, an electronic device 100 according to an exemplary embodiment in the present disclosure may include a display apparatus 110 for displaying an image, an input unit 120, an audio unit 130 for outputting audio, and a touchscreen apparatus (not illustrated in FIG. 1) formed integrally with the display apparatus 110.

The touchscreen apparatus according to an exemplary embodiment in the present disclosure may include a substrate and a panel unit, and a plurality of electrodes may be provided on the substrate. Also, the touchscreen apparatus according to the exemplary embodiment in the present disclosure may include a controller integrated circuit (a touch sensing apparatus) including a capacitance detection circuit detecting changes in capacitance generated in the plurality of electrodes, an analog-to-digital conversion circuit converting a signal output by the capacitance detection circuit into a signal having a digital value, an operation circuit determining a touch occurrence using the converted digital data, and the like. A more detailed description thereof will be provided below with reference to FIGS. 2 through 7.

Figure 2:
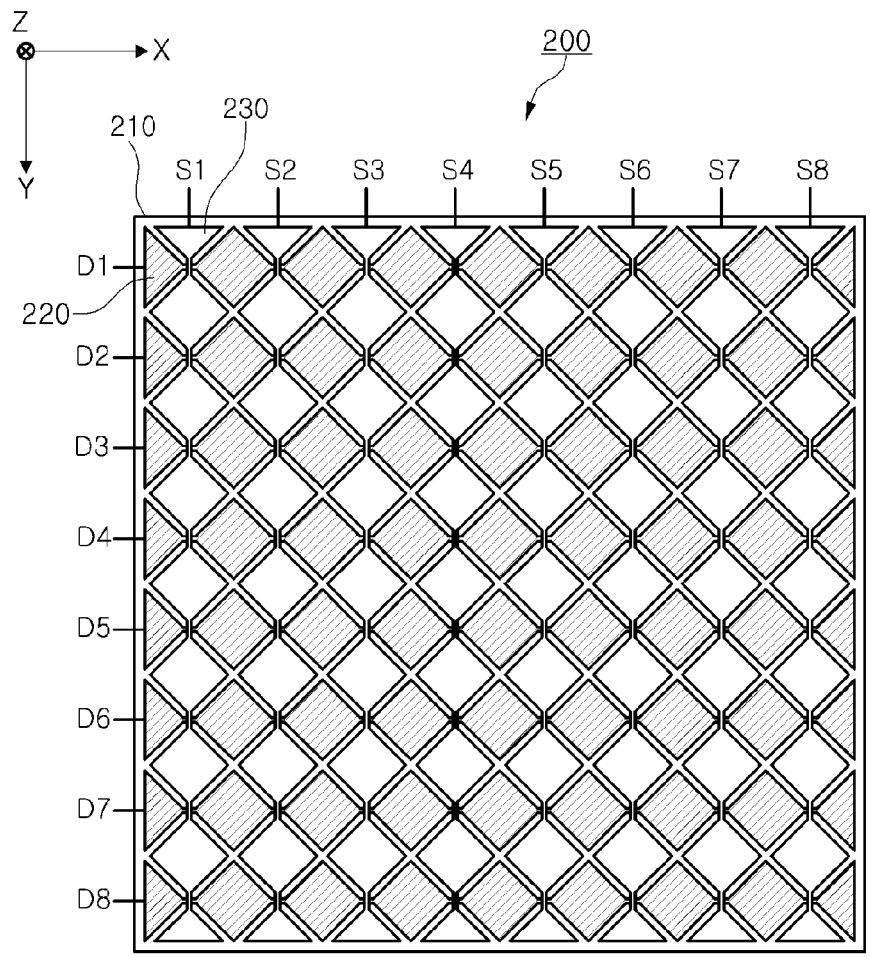
FIG. 2 is a diagram illustrating a panel unit that may be included in the touchscreen apparatus according to an exemplary embodiment in the present disclosure.

FIG. 2 is a diagram illustrating a panel unit that may be included in the touchscreen apparatus according to an exemplary embodiment in the present disclosure.

Referring to FIG. 2, the panel unit 200 according to the exemplary embodiment in the present disclosure may include a substrate 210 and a plurality of electrodes 220 and 230 provided on the substrate 210. Although not illustrated in FIG. 2, the plurality of respective electrodes 220 and 230 may be electrically connected to a wiring pattern of a circuit board attached to one end of the substrate 210 by wirings and a bonding pad. The controller integrated circuit may be mounted on the circuit board to detect sensing signals from the plurality of electrodes 220 and 230 and determine the occurrence of touches from the sensing signals.

The substrate 210 may be formed of a material such as a film such as polyethylene terephtalate (PET), polycarbonate (PC), polyethersulfone (PES), polyimide (PI), polymethlymethacrylate (PMMA), cyclo-olefin polymers (COP), or the like, soda glass, or tempered glass to have high light transmittance.

The plurality of electrodes 220 and 230 may be formed on one surface or both surfaces of the substrate 210. While a case in which the plurality of electrodes 220 and 230 have rhomboid or diamond shaped patterns is illustrated in FIG. 2, the plurality of electrodes 220 and 230 may also have various types of polygonal pattern, such as a rectangular pattern, a triangular pattern, or the like. The plurality of electrodes 220 and 230 may be formed of a material such as indium tin oxide (ITO), indium zinc oxide (IZO), a zinc oxide (ZnO), carbon nanotubes (CNT), or a graphene having electrical conductivity, and may also be configured of a conductive line manufactured using any one of silver (Ag), aluminum (Al), chromium (Cr), nickel (Ni), molybdenum (Mo), and copper (Cu), or an alloy thereof. In this case, the conductor line may be formed to have a mesh shape.

The plurality of electrodes 220 and 230 may include a first electrode 220 extended in an X axis direction and a second electrode 230 extended in a Y axis direction. The first electrode 220 and the second electrode 230 may be provided on both surfaces of the substrate 210 or may be provided on different substrates 210 to intersect with each other. In the case in which both the first electrode 220 and the second electrode 230 are provided on one surface of the substrate 210, an insulating layer may be partially formed at predetermined intersection point between the first electrode 220 and the second electrode 230.

Further, in addition to a region in which the plurality of electrodes 220 and 230 are formed, with respect to a region in which wirings connected to the plurality of electrodes 220 and 230 are provided, a predetermined printed region (not illustrated) for visually shielding the wirings, generally formed of an opaque metal, may be formed on the substrate 210.

The touch sensing apparatus (not illustrated) which is electrically connected to the plurality of electrodes 220 and 230, may provide a driving signal to the first electrode 220 through channels defined as D1 to D8, and may be connected to channels defined as S1 to S8 to detect capacitance. In this case, the touch sensing apparatus may determine the touch depending on changes in capacitance generated in intersections between the first electrode 220 and the second electrode 230.

Figure 3:
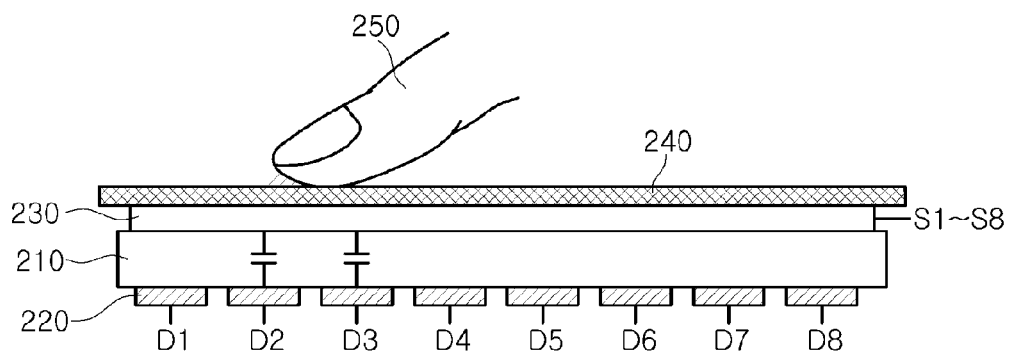
FIG. 3 is a cross-sectional view of the panel unit that may be included in the touchscreen apparatus according to an exemplary embodiment in the present disclosure.

FIG. 3 is a cross-sectional view of the panel unit that may be included in the touchscreen apparatus according to an exemplary embodiment in the present disclosure. FIG. 3 is a cross-sectional view of the panel unit 200 of FIG. 2 taken along a Y-Z plane. The panel unit 200 may further include a cover lens 240 to which a touch is applied, in addition to the substrate 210 and the plurality of sensing electrodes 220 and 230 described in FIG. 2. The cover lens 240 may be provided on the second electrode 230 used for detecting capacitance.

When the driving signal is applied to the first electrode 220 through channels D1 to D8, capacitance may be generated between the first electrode 220 to which the driving signal is applied and the second electrode 230.

When a touching object 250 touches the cover lens 240, a change in capacitance may be generated in an intersection node of the first electrode 220 and the second electrode 230 corresponding to a touch region. The change in capacitance may be in proportion to an area of the touching object 250. In FIG. 3, the capacitance generated between the first electrode 220 and the second electrode 230 connected to channels D2 and D3, respectively, may be affected by the touching object 250.

Figure 4:
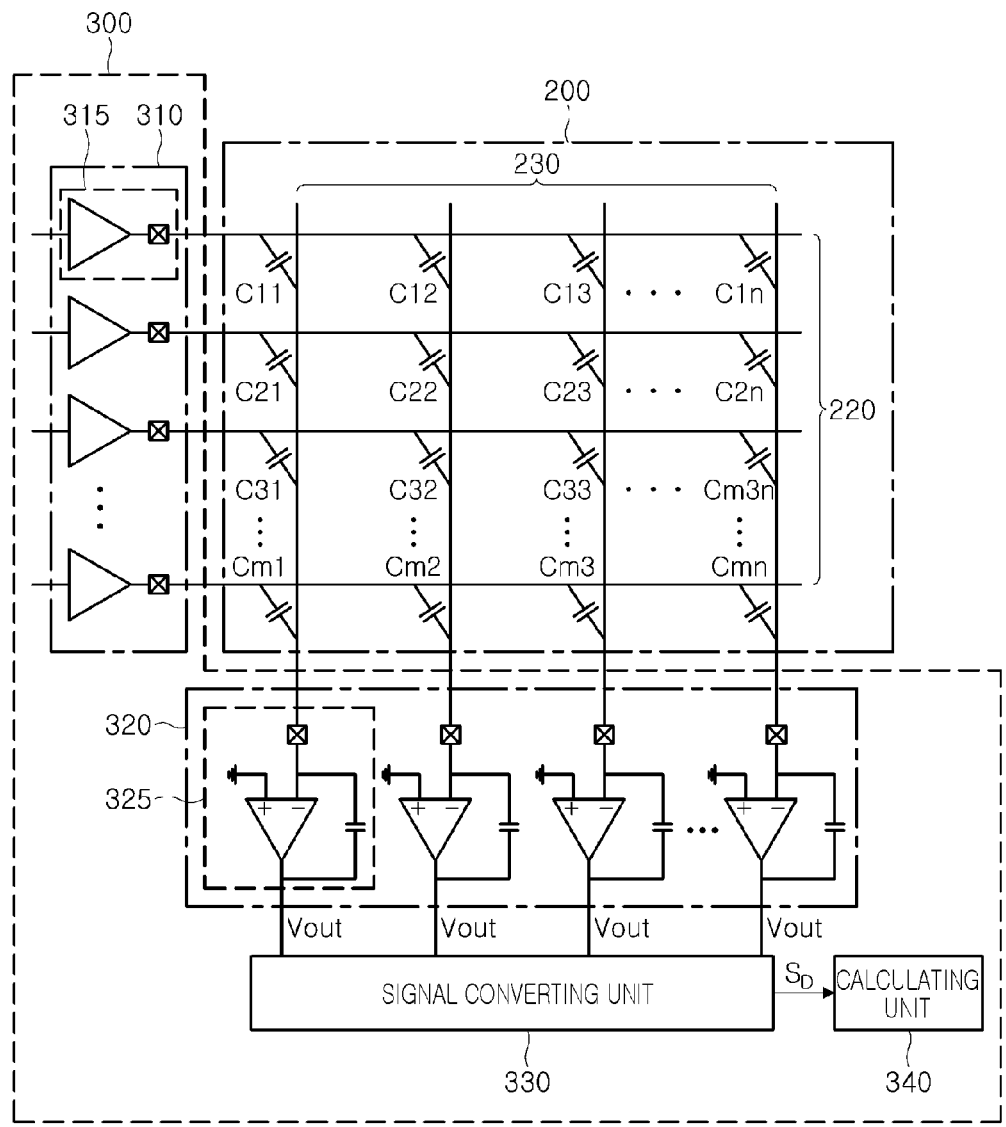
FIG. 4 is a diagram illustrating a touchscreen apparatus according to an exemplary embodiment in the present disclosure.

FIG. 4 is a diagram illustrating a touchscreen apparatus according to an exemplary embodiment in the present disclosure. Referring to FIG. 4, the touchscreen apparatus according to the exemplary embodiment in the present disclosure may include a panel unit 200 and a touch sensing apparatus 300.

As described above, the panel unit 200 may include a substrate (not illustrated), a plurality of rows of first electrodes 220 extended in a first axis direction (i.e., a horizontal direction of FIG. 4), and a plurality of columns of second electrodes 230 extended in a second axis direction (i.e., a vertical direction of FIG. 4) intersecting with the first axis direction. Capacitance may be formed at the intersections between the plurality of first electrodes 220 and the plurality of second electrodes 230. Node capacitors C11 to Cmn illustrated in FIG. 4 illustrate the capacitance generated in the intersections between the plurality of first electrodes 220 and the plurality of second electrodes 230 as capacitor components.

Figure 5:
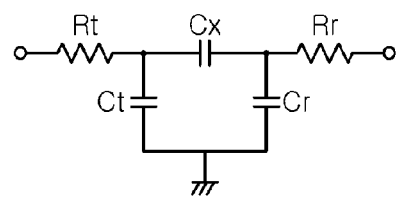
FIG. 5 is a circuit diagram illustrating a node capacitor according to an exemplary embodiment in the present disclosure in more detail.

FIG. 5 is a circuit diagram illustrating a node capacitor according to an exemplary embodiment in the present disclosure in more detail.

A mutual capacitor Cx and parasitic components Rt, Rr, Ct, and Cr correspond to the node capacitor Cm of FIG. 4, and the parasitic components Rt and Ct illustrate parasitic resistance and parasitic capacitance generated by the plurality of first electrodes of FIG. 4 and the parasitic components Rr and Cr illustrate parasitic resistance and parasitic capacitance generated by the plurality of second electrodes of FIG. 4.

In detail, the plurality of node capacitors C11 to Cmn in the intersections of the plurality of electrodes may have the same capacitance value of the mutual capacitor Cx, but actually, the parasitic components Rt, Rr, Ct, and Cr in addition to the capacitor Cx may be formed in the panel unit 200 due to inevitable process errors occurring upon manufacturing the panel unit 200. Due to the process errors described above, each of the node capacitors C11 to Cmn may have a capacitance deviation of 10 to 40%. The capacitance deviation of the node capacitors C11 to Cmn may originate from the parasitic components Rt, Rr, Ct, and Cr formed in series-parallel with the mutual capacitor Cx, and the parasitic components Rt, Rr, Ct, and Cr may act as factors causing a delay of the driving signal and decreasing a level of the driving signal.

The touch sensing apparatus 300 may include a driving circuit unit 310, a sensing circuit unit 320, a signal converting unit 330, and a calculating unit 340. In this case, the driving circuit unit 310, the sensing circuit unit 320, the signal converting unit 330, and the calculating unit 340 may be implemented in a single integrated circuit (IC).

The driving circuit unit 310 may include one or more driving signal generating circuits 315 to apply a predetermined driving signal to the plurality of first electrodes 210 of the panel unit 200. The driving signal may be a square wave signal, a sine wave signal, a triangle wave signal, or the like, having a predetermined period and amplitude. Although the case in which the driving signal generating circuits 315 are individually connected to the plurality of first electrodes 210, respectively, as illustrated in FIG. 4, a configuration is also possible in which the driving circuit unit 310 includes a single driving signal generating circuit 315 and applies the driving signal to the plurality of respective first electrodes 210, using a switching circuit.

The driving circuit unit 310 may sequentially apply the driving signal to the plurality of first electrodes 210, respectively. In addition, the driving circuit unit 310 may be operated in a scheme in which the driving circuit unit 310 concurrently applies the driving signal to the plurality of first electrodes 220 or selectively applies the driving signals to only some of the plurality of first electrodes 220 to simply sense whether a touch has occurred or not.

The sensing circuit unit 320 may detect capacitance of the node capacitors C11 to Cmn from the plurality of second electrodes 230. The sensing circuit unit 320 may include a plurality of C-V converting circuits 325 each including at least one operational amplifier and at least one capacitor, and here, each of the plurality of C-V converting circuits 325 may be connected to the plurality of second electrodes 220.

The plurality of C-V converting circuits 325 may convert the levels of capacitance of the node capacitors C11 to Cmn to voltage signals to output analog signals. As an example, the plurality of C-V converting circuits 325 may integrate the levels of capacitance to change and output the capacitance as a predetermined voltage.

In the case in which the driving signals are sequentially applied to the plurality of first electrodes 220, since the levels of capacitance from the plurality of second electrodes 230 may be concurrently detected, the number of C-V converting circuits 325 may correspond to the number of plurality of second electrodes 230.

The signal converting unit 330 may generate a digital signal $S_D$ from the analog signals output by the sensing circuit unit 320. As an example, the signal converting unit 330 may include a time-to-digital converter (TDC) circuit measuring a time at which the analog signal output from the sensing circuit unit 320 in voltage form reaches a predetermined reference voltage level and converting the measured time into the digital signal $S_D$ or an analog-to-digital converter (ADC) circuit measuring an amount by which a level of the analog signal output by the sensing circuit unit 320 is changed for a predetermined time and converting the changed amount into the digital signal $S_D$.

The calculating unit 340 may determine that a touch has been applied to the panel unit 200 using the digital signals $S_D$. The calculating unit 340 may determine the number, coordinates, gestures, or the like, of touches applied to the panel unit 200.

The digital signal $S_D$, the basis for determining the touch by the calculating unit 340, may be data digitalizing the change in levels of capacitance of the node capacitors C11 to Cmn, and in detail, may be data indicating a difference in capacitance between a case in which a touch is not generated and a case in which a touch is generated. Typically, in capacitive type touchscreens, a region which a conductive object touches has reduced capacitance as compared with a region which the conductive object does not touch. Therefore, the region which the conductive object touches may have a change in capacitance greater than that occurring in the region in which the conductive object does not touch.

Figure 6:
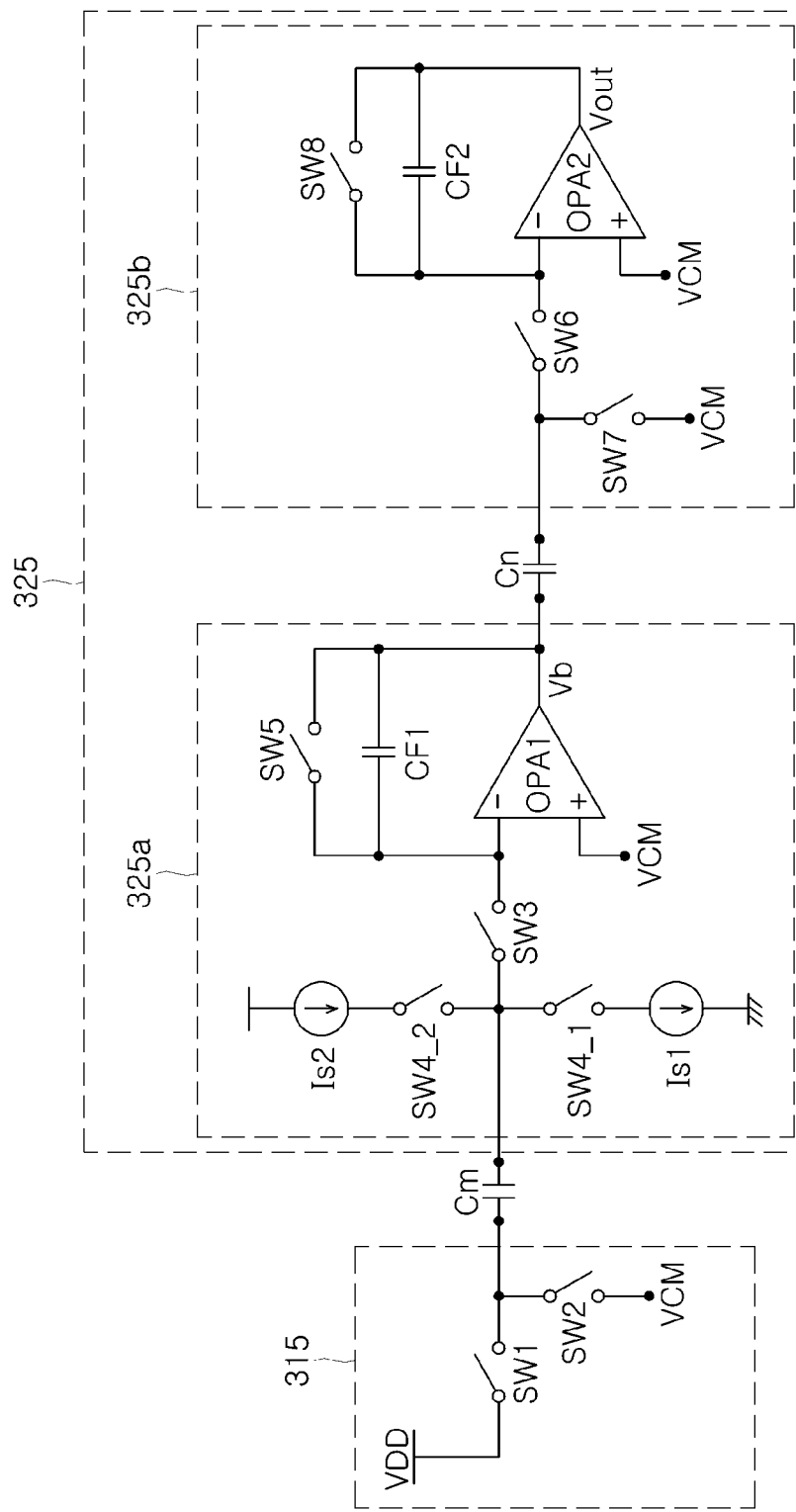
FIG. 6 is a circuit diagram illustrating a driving signal generating circuit and a C-V converting circuit of a touch sensing apparatus according to an exemplary embodiment in the present disclosure.

FIG. 6 is a circuit diagram illustrating the driving signal generating circuit 315 and the C-V converting circuit 325 of a touch sensing apparatus 300 according to an exemplary embodiment in the present disclosure.

The driving signal generating circuit 315 may include a switch SW1 and a switch SW2, and the switch SW1 is disposed between a first node of the node capacitor Cm and a driving voltage VDD terminal. The switch SW2 may be disposed between the first node of the node capacitor Cm and a common voltage VCM terminal. Here, the switches SW1 and SW2 may be switched at different timings to transfer the driving signal to the node capacitor Cm. The common voltage VCM may correspond to a half level of the driving voltage VDD. However, in addition to this, the common voltage VCM may correspond to a level of a ground GND voltage.

Referring to FIGS. 4 and 6, each of the plurality of C-V converting circuit 325 used for the sensing circuit unit 320 may include a buffer circuit 325a, the buffer capacitor Cn, and an integrating circuit 325b.

The buffer circuit 325a may include an operational amplifier OPA1, a feedback capacitor CF1, a switch SW3, a switch SW4_1, a switch SW_2, and a switch SW5. The switch SW3 may be disposed between a second node of the node capacitor Cm and an inverting terminal of the operational amplifier OPA1, the switch SW4_1 may be disposed between the second node of the node capacitor Cm and a discharging current source Is1, and the discharging current source Is1 may be disposed between the switch SW4_1 and the ground. The switch SW4_2 may be disposed between the second node of the node capacitor Cm and a charging current source Is2, and the charging current source Is2 may be disposed between the switch SW4_2 and the driving voltage (VDD) terminal.

The switch SW5 may be disposed between the inverting terminal and an output terminal of the operational amplifier OPA1, and the feedback capacitor CF1 maybe connected to a fifth switch SW5 in parallel. A non-inverting terminal of the operational amplifier OPA1 may be connected to the common voltage VCM terminal.

Charges stored in the node capacitor Cm may be output from the output terminal of the operational amplifier OPA1 as an output voltage Vb, by switching operations of the switches SW1 to SW5. The output voltage Vb may be determined according to capacitance of the node capacitor Cm and the feedback capacitor CF1. Therefore, the feedback capacitor CF1 may be configured to have higher capacitance than that of the node capacitor Cm in which charges to be measured are charged, thereby preventing the output voltage Vb of the buffer circuit 325a from being saturated.

According to an exemplary embodiment in the present disclosure, by connecting the discharging current sources Is1 and Is2 to the second node of the node capacitor Cm through the switches SW4_1 and SW4_2 to adjust a level of voltage charged in the node capacitor Cm, even in a case in which capacitance of the feedback capacitor CF1 is reduced, the saturation of the output voltage Vb of the buffer circuit 325a may be prevented.

By adjusting times at which the switches SW4_1 and SW4_2 are switched on, depending on deviations in capacitance between the plurality of node capacitors C11 to Cmn illustrated in FIG. 4, deviations in capacitance of the respective node capacitors C11 to Cmn may be reduced.

The buffer capacitor Cn may have a first node connected to the output terminal of the operational amplifier OPA1 and may be charged or discharged according to magnitude and polarity of the output voltage Vb.

The integrating circuit 325b may include an operational amplifier OPA2, a feedback capacitor CF2, a switch SW6, a switch SW7, and a switch SW8. The switch SW6 may be disposed between a second node of the buffer capacitor Cn and an inverting terminal of the operational amplifier OPA2, and the switch SW7 may be disposed between the second node of the buffer capacitor Cn and a common voltage VCM terminal. The switch SW8 may be disposed between the inverting terminal and an output terminal of the operational amplifier OPA2, and the feedback capacitor CF2 may be connected to the switch SW8 in parallel. A non-inverting terminal of the operational amplifier OPA2 may be connected to the common voltage VCM terminal.

Charges stored in the buffer capacitor Cn may be integrated by the feedback capacitor CF2 and the operational amplifier OPA2 and may be output from the output terminal of the operational amplifier OPA2 as an output voltage Vout, by switching operations of the switches SW6 and SW7. The output voltage Vout may be determined according to capacitance of the buffer capacitor Cn and the feedback capacitor CF2.

FIG. 6 is a graph illustrating clock signals applied to a plurality of switches SW1 to SW8 and an output voltage generated through a switching operation according to the clock signals. The clock signals CLK1 to CLK8 may be applied to the switches SW1 to SW8, respectively, wherein when the clock signal is at a high level, the switch may be turned on, and when the clock signal is at a low level, the switch may be turned off.

Hereinafter, operations of the driving signal generating circuit 315 and the C-V converting circuit 325 according to an exemplary embodiment in the present disclosure will be described in detail with reference to FIGS. 6 and 7.

A section (1) may correspond to a reset section, wherein the switches SW2, SW5, and SW8 may be turned on and the switches SW1, SW3, SW4_1, SW4_2, SW6 and SW7 may be turned off.

The switch SW2 is turned on, such that the first node of the node capacitor may be maintained at the level of the common voltage VCM, and the switch SW5 is turned on, such that the output voltage Vb of the operational amplifier OPA1 may be equal to the common voltage VCM. In addition, the switch SW8 is turned on, such that the output voltage Vout of the operational amplifier OPA2 may be equal to the common voltage VCM.

In a section (2), the switches SW1, SW4_1, SW5, and SW6 may be turned on, and the switches SW2, SW3, SW4_2, SW7, and SW8 may be turned off.

The switch SW1 is turned on, such that the first node of the node capacitor Cm may be maintained at the level of the driving voltage VDD, and the switch SW4_1 is turned on, such that charges of the discharging current source Is1 may be discharged from the second node of the node capacitor Cm.

As a charging voltage of the node capacitor Cm is partially discharged by the switching operation of the switch SW4_1, an amount of charges transferred to the feedback capacitor CF1 is adjusted in the following step, the saturation of the output voltage Vb of the buffer circuit 325a may be prevented even in a case in which the capacitance of the feedback capacitor CF1 is reduced.

Figure 7:
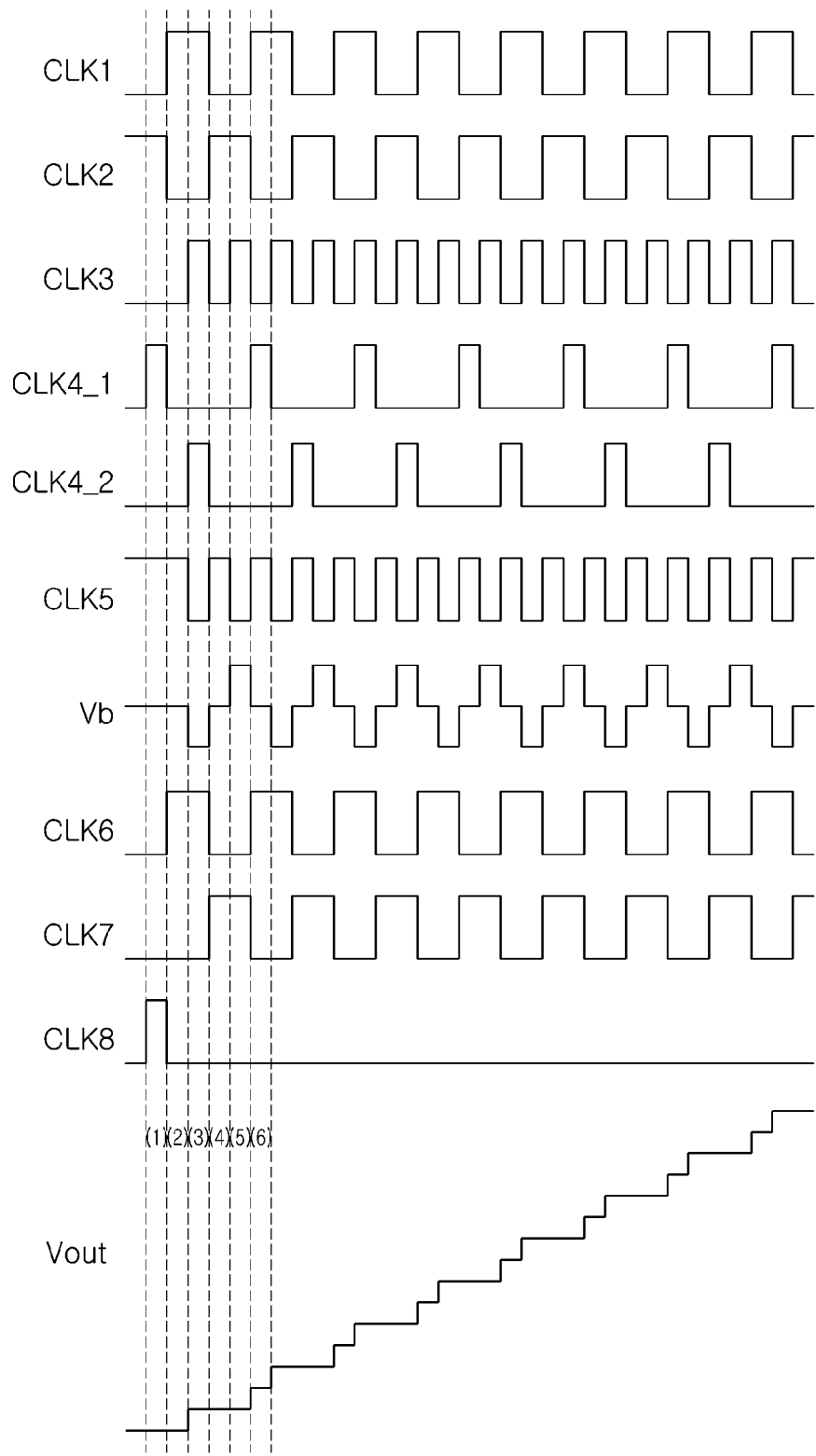
FIG. 7 is a graph illustrating clock signals applied to a plurality of switches and an output voltage generated through a switching operation according the clock signals.

Although the case in which the clock signal CLK4_1 is at the high level in the overall section (2) is illustrated in FIG. 7, the section in which the clock signal CLK4_1 is at the high level may be changed depending on the capacitance of the node capacitor Cm and the first feedback capacitor CF1 in order to prevent the output voltage Vb of the buffer circuit 325a from being saturated. In addition, the section in which the clock signal CLK4_1 is at the high level may be changed for each channel depending on the deviation in capacitance between the plurality of node capacitors C11 to Cmn of FIG. 4.

The section in which the clock signal CLK4_1 is at the high level may be changed within the section (2), wherein the clock signal CLK4_1 may maintain the high level in the overall section (2) at maximum and there is no section in which the clock signal CLK4_1 is at the high level, in some cases.

For example, in a case in which a capacitance value of the node capacitor C11 of FIG. 4 is high and a capacitance value of the node capacitor C21 is low, a section in which the clock signal CLK4_1 is provided to the switch SW4_1 when being connected to the node capacitor C11 is at the high level may be longer than a section in which the clock signal CLK4_1 is provided to the switch SW4_1 when being connected to the node capacitor C21 is at the high level.

Here, the section in which the clock signal CLK4_1 is at the high level is illustrated as being changed for each channel of the first electrodes 220 of FIG. 4, but in addition to this, the section in which the clock signal CLK4_1 is at the high level may be changed for each channel of the second electrodes 230.

Further, the switch SW5 is turned on, such that the voltage level of the output voltage Vb of the first operational amplifier OPA1 may be maintained at the level of the common voltage VCM. Since the switch SW6 is turned on but there is no charge charged in the buffer capacitor Cn in a previous step, the output voltage Vout of the operational amplifier OPA2 may be maintained at a level of the common voltage VCM.

In a section (3), the switches SW1, SW3, and SW6 may be turned on, and the switches SW2, SW4_1, SW4_2, SW5, SW7 and SW8 may be turned off.

As the switch SW3 is turned on, the second node of the node capacitor Cm may be held at the common voltage VCM by the feedback of the operational amplifier OPA1. Here, the charges charged in the node capacitor Cm is non-inversely integrated, such that the output voltage Vb of the operational amplifier OPA1 may be dropped according to a ratio of the node capacitor Cm and the feedback capacitor CF1. In this case, the output voltage Vb of the operational amplifier OPA1 in the section (3) may be generated by the charges charged by the node capacitor Cm.

The switch SW6 is turned on, such that charges as much as (Vb-VCM) charged in the buffer capacitor Cn are integrated by the operational amplifier OPA2 to increase the level of the output voltage Vout.

In a section (4), the switches SW2, SW4_2, SW5 and SW7 may be turned on, and the switches SW1, SW3, SW4_1, SW6 and SW8 may be turned off.

The switch SW2 is turned on, such that the first node of the node capacitor Cm may be maintained at the level of the common voltage VCM, and the switch SW4_2 is turned on, such that charges of the charging current source Is2 may be supplied to the second node of the node capacitor Cm.

As the charges are supplied to the second node of the node capacitor Cm by the switching operation of the switch SW4_2, an amount of charges transferred to the feedback capacitor CF1 is adjusted in the following step, and the saturation of the output voltage Vb of the buffer circuit 325a may be prevented even in a case in which the capacitance of the feedback capacitor CF1 is reduced.

Although the case in which the clock signal CLK4_1 is at the high level in the overall section (4) is illustrated in FIG. 7, the section in which the clock signal CLK4_2 is at the high level may be changed depending on the capacitance of the node capacitor Cm and the first feedback capacitor CF1 in order to prevent the output voltage Vb of the buffer circuit 325a from being saturated. In addition, the section in which the clock signal CLK4_2 is at the high level may be changed for each channel depending on the deviation in capacitance between the plurality of node capacitors C11 to Cmn of FIG. 4.

The section in which the clock signal CLK4_2 is at the high level may be changed within the section (4), and here, the clock signal CLK4_2 may maintain the high level in the overall section (4) at maximum and there may be no section in which the clock signal CLK4_2 is at the high level, in some cases.

For example, in a case in which a capacitance value of the node capacitor C11 of FIG. 4 is relatively high and a capacitance value of the node capacitor C21 is relatively low, a section in which the clock signal CLK4_2 provided to the switch SW4_2 when being connected to the node capacitor C11 is at the high level may be longer than a section in which the clock signal CLK4_2 provided to the switch SW4_2 when being connected to the node capacitor C21 is at the high level.

The case that the section in which the clock signal CLK4_2 is at the high level is changed for each channel of the first electrodes 220 of FIG. 4 has been described above. However, in addition to this, the section in which the clock signal CLK4_2 is at the high level may be changed for each channel of the second electrodes 230.

In addition, in a section (4), the switch SW5 is turned on, such that the operational amplifier OPA1 may be reset to output the common voltage VCM. The switch SW6 is turned off, such that the output voltage Vout of the second operational amplifier OPA2 may be maintained.

In a section (5), the switches SW2, SW3, and SW7 may be turned on, and the switches SW1, SW4_1, SW4_2, SW5, SW6 and SW8 may be turned off.

The switch SW3 is turned on, the charges charged in the node capacitor Cm may be transferred to the feedback capacitor CF1 to increase the level of the output voltage Vb.

In addition, since the switch SW6 is turned off and the switch SW7 is turned on, the output voltage Vout of the second operational amplifier may be maintained and charges as much as (Vb-VCM) may be charged in the buffer capacitor Cn.

In a section (6), the switches SW1, SW4_1, SW5, and SW6 may be turned on, and the switches SW2, SW3, SW4_2 and SW7 may be turned off.

The switch SW5 is turned on, such that the operational amplifier OPA1 may be reset and output the common voltage VCM. In this case, the switch SW6 is turned off and the switch SW7 is turned off, and the charges charged in the buffer capacitor Cn may be transferred to the feedback capacitor CF2 to increase the output voltage Vout of the second operational amplifier.

As set forth above, according to exemplary embodiments in the present disclosure, the touch sensing apparatus and the touchscreen apparatus may prevent saturation of the sensing signal due to excessive capacitance and significantly reduce deviations in capacitance between the plurality of nodes.

While exemplary embodiments have been shown and described above, it will be apparent to those skilled in the art that modifications and variations could be made without departing from the scope of the present invention as defined by the appended claims.

What is claimed is:

1. A touch sensing apparatus comprising:
a driving signal generating circuit comprising a first switch and a second switch and providing driving signals to a first node of a node capacitor, the driving signals being generated by switching operations of the first switch and the second switch; and
a C-V converting circuit comprising a buffer circuit including a first feedback capacitor and a third switch disposed between a second node of the node capacitor and the first feedback capacitor and transferring a charging voltage to the first feedback capacitor from the node capacitor through a switching operation of the third switch to generate an output voltage,
wherein the buffer circuit further comprises a fourth switch disposed between the second node of the node capacitor and a current source and the fourth switch is turned on in an off operation section of the third switch, and
wherein an on operation section of the fourth switch is determined according to capacitance of the node capacitor and the first feedback capacitor.

2. The touch sensing apparatus of claim 1, wherein the first switch is disposed between the first node of the node capacitor and a driving voltage terminal and the second switch is disposed between the first node of the node capacitor and a common voltage terminal.

3. The touch sensing apparatus of claim 2, wherein the first switch and the second switch have switching periods having a phase difference of 180°.

4. The touch sensing apparatus of claim 1, wherein;
the fourth switch comprises a 4_1-th switch and a 4_2-th switch, and the current source comprises a discharging current source and a charging current source; and
the 4_1-th switch is disposed between the second node of the node capacitor and the discharging current source, and the 4_2-th switch is disposed between the second node of the node capacitor and the charging current source.

5. The touch sensing apparatus of claim 4, wherein the third switch has a switching period corresponding to a half of switching periods of the first switch and the second switch, and the third switch is turned off at points in time at which the first switch is turned on and turned off.

6. The touch sensing apparatus of claim 5, wherein; the 4_1-th switch is turned on in an on operation section of the first switch and is not overlapped with an on operation section of the third switch; and
the 4_2-th switch is turned on in an on operation section of the second switch and is not overlapped with the on operation section of the third switch.

7. The touch sensing apparatus of claim 4, wherein the buffer circuit further comprises:
a first operational amplifier comprising an input terminal connected to one end of the first feedback capacitor and an output terminal connected to the other end of the first feedback capacitor; and
a fifth switch connected to the first feedback capacitor in parallel.

8. The touch sensing apparatus of claim 7, wherein the third switch and the fifth switch have switching periods having a phase difference of 180°.

9. The touch sensing apparatus of claim 1, wherein the output voltage of the buffer circuit regularly repeats a decrease, hold, increase, hold, increase, hold, decrease, and hold sequence.

10. The touch sensing apparatus of claim 1, wherein the C-V converting circuit further comprises:
   a buffer capacitor which is charged and discharged by the output voltage of the buffer circuit; and
   an integrating circuit integrating a voltage charged in the buffer capacitor.

11. The touch sensing apparatus of claim 10, wherein the integrating circuit integrates the voltage charged in the buffer capacitor to generate an output voltage which is changed at least two times for one period of the driving signal.

12. The touch sensing apparatus of claim 11, wherein the output voltage of the integrating circuit is increased at a point in time at which the output voltage of the buffer circuit is decreased.

13. The touch sensing apparatus of claim 10, wherein the integrating circuit comprises:
   a sixth switch comprising one end connected to the buffer capacitor;
   a seventh switch disposed between the buffer capacitor and a common voltage terminal;
   a second operational amplifier comprising an inverting terminal connected to the other end of the sixth switch and a non-inverting terminal connected to the common voltage terminal;
   an eighth switch disposed between the inverting terminal of the second operational amplifier and an output terminal of the second operational amplifier; and
   a second feedback capacitor connected to the eighth switch in parallel.

14. A touchscreen apparatus comprising:
   a panel unit comprising a plurality of first electrodes and a plurality of second electrodes;
   a driving circuit unit comprising a driving signal generating circuit including a first switch and a second switch and providing driving signals to the plurality of first electrodes, the driving signals being generated by switching operations of the first switch and the second switch; and
   a sensing circuit unit comprising a plurality of C-V converting circuits each including a plurality of buffer circuits connected to the plurality of second electrodes, respectively,
   wherein each of the buffer circuits comprises first feedback capacitor, a third switch disposed between one second electrode among the plurality of second electrodes and the first feedback capacitor, and a fourth switch disposed between a connection node of the one second electrode and the first feedback capacitor and a current source,
   wherein the fourth switch is turned on in an off operation section of the third switch, and
   wherein an on operation section of the fourth switch determined according to deviation in capacitance between a plurality of node capacitors formed at intersection node of the plurality of first electrodes and the plurality of second electrodes.

15. The touchscreen apparatus of claim 14, wherein;
   the fourth switch comprises a 4_1-th switch and a 4_2-th switch, and the current source comprises a discharging current source and a charging current source; and
   the 4_1-th switch is disposed between the connection node of the one second electrode and the first feedback capacitor, and the discharging current source, and the 4_2-th switch is disposed between the connection node of the one second electrode and the first feedback capacitor, and the charging current source.

16. The touchscreen apparatus of claim 15, wherein the third switch has a switching period corresponding to a half of switching periods of the first switch and the second switch, and the third switch is turned off at points in time at which the first switch is turned on and turned off.

17. The touchscreen apparatus of claim 16, wherein; the 4_1-th switch is turned on in an on operation section of the first switch and is not overlapped with an on operation section of the third switch; and
   the 4_2-th switch is turned on in an on operation section of the second switch and is not overlapped with the on operation section of the third switch.

18. The touchscreen apparatus of claim 14, wherein each of the plurality of buffer circuits further comprises:
   a first operational amplifier comprising an input terminal connected to one end of the first feedback capacitor and an output terminal connected to the other end of the first feedback capacitor; and
   a fifth switch connected to the first feedback capacitor in parallel.

* * * * *